United States Patent [19]
Eukuda

[11] 3,791,197
[45] Feb. 12, 1974

[54] AIR LEAKAGE DETECTOR USING A DIRECT PRESSURE SYSTEM

[76] Inventor: Akira Eukuda, 2-22-8 Kasuga-cho, Nerima-ku, Tokyo, Japan

[22] Filed: May 5, 1972

[21] Appl. No.: 250,724

[30] Foreign Application Priority Data
Jan. 10, 1972 Japan.................................. 47/5878

[52] U.S. Cl. ................................................ 73/49.3
[51] Int. Cl. .......................................... G01m 3/04
[58] Field of Search ......... 73/40, 41, 45, 45.1, 45.2, 73/45.9, 49.2, 49.3, 52, 149

[56] References Cited
UNITED STATES PATENTS

| | | | |
|---|---|---|---|
| 2,589,251 | 3/1952 | Heinz | 73/37.5 |
| 2,924,965 | 2/1960 | Westerheim | 73/40 |
| 3,028,750 | 4/1962 | Rondeau | 73/40 |
| 3,355,932 | 12/1967 | Mulligan | 73/49.3 |

*Primary Examiner*—S. Clement Swisher

[57] ABSTRACT

A pneumatic circuit for testing articles for leaks which includes a pair of receptacles, one for the object being tested and the other for a comparison object. The pneumatic bridge circuit includes a pair of restrictors in the charging circuit.

1 Claim, 6 Drawing Figures

AIR LEAKAGE DETECTOR USING A DIRECT PRESSURE SYSTEM

BRIEF DESCRIPTION OF THE INVENTION

The present invention is designed to improve distribution piping for the supply of compressed air to an air-tight receptacle containing the object to be tested by the air leak detector, as well as to an other air-tight receptacle of equal capacity. There is no need for a storage tank of a fixed volume to facilitate the flow supply of compressed air, as is the case with traditional solid-type air leakage testers. Detection of air leakage is made possible by the relatively simple distribution piping construction.

DRAWINGS

FIG. 1 is a schematic diagram illustrating the route by which compressed air is piped to the air leakage detector by the present invention. FIGS. 2A and 2B explain by electrical analogy operations applicable to the air leakage tester in accordance with the present invention. FIG. 3 is cross sectional enlargement of the principle part of the detector relevant to the present invention. FIGS. 4A and 4B are illustrations explaining the operation of the volume flow adjustment component of FIG. 3.

DETAILED DESCRIPTION OF THE INVENTION

Figure 1:
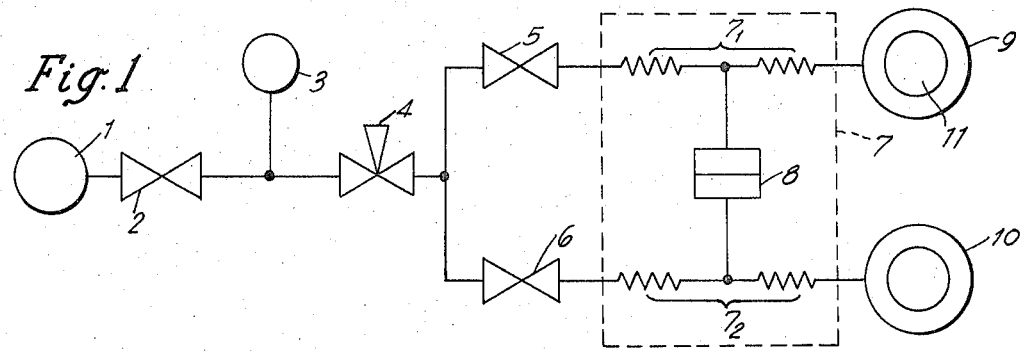

The following gives an explanation of the drawings illustrating the present invention. FIG. 1 indicates the piping system for distributing compressed air to the air leakage detector in accordance with the present invention. Number 1 in the drawing represents the compressed air source; number 2, the decompression valve number 3, the pressure gauge; number 4, three-directional valve; numbers 5 and 6, two-directional valves; number 7, the volume flow adjustment construction section; number 8, the pressure differential detector; numbers 9 and 10, equal capacity air-tight receptacles: 9 is the receptacle containing the object being tested for air leakage (11), and 10 is the receptacle in which a reference object may or may not be placed.

The present invention operates in the following manner: Compressed air is supplied at increasing pressures from the compressed air source (1) to the air-tight receptacle containing the object being tested for air leakage (9), and to the reference air-tight receptacle (10) of the same capacity; the test object is then examined for air leakage by measuring for a pressure differential between the two air-tight receptacles. At this point, if air is suddenly supplied to the two air-tight receptacles, using wide diameter supply piping from the air source, there will be almost no difference in the pressure between the receptacles, even in the event of an air leak existing in the receptacle containing the test object. Moreover, the occurrence of a turbulent flow in the increasing air supply as it enters the receptacles will give rise to a pressure differential between the two receptacles, even though they are of the same capacity.

If an increasing air supply is furnished to the two receptacles over an appropriate period of time, the presence of air leakage in the test object will produce a pressure differential between the two receptacles. Accordingly, the present invention uses a volume flow adjustment structure, based on air micrometer theory, as a means of arresting the volume of flow of the supply conduits.

Figure 2A:
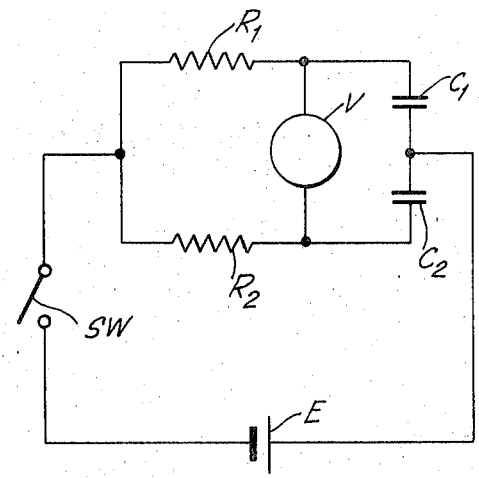
Figure 2B:
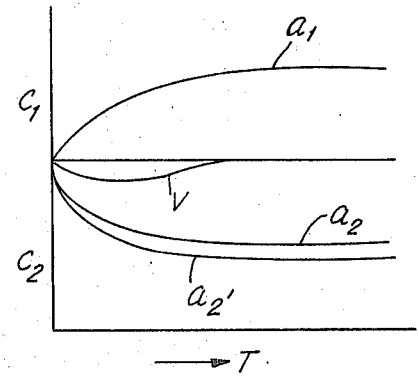

FIG. 2 explains by electrical analog circuits applicable to the piping conduits of FIG. 1. In the case of the circuit charging in parallel the two condensers C1 and C2, the charge emanating from the electricity source E and traversing the two resistances R1 and R2, the following respective correspondences apply: The condensers C1 and C2 correspond to the air-tight receptacles 9 and 10 in FIG. 1; the resistances R1 and R2 correspond to the volume flow adjustment structure section 71 and 72; the electricity meter V corresponds to the pressure differential detector 8; and the electricity source E corresponds to the air source 1. In the circuit in FIG. 2A, when the switch of the electricity source E is thrown, because the curves while charging is taking place with R1 = R2 and C1 = C2, are equal as shown in FIG. 2B where the curves are $a1$ and $a2$, no voltage appears on the electricity meter. Should C1 and C2 be unequal, e.g., C2>C1, the charging curves are as illustrated in $a1$ and $a2$. During the charging, the electricity meter V shows a voltage differential V, and a difference in charge can be detected.

Figure 3:
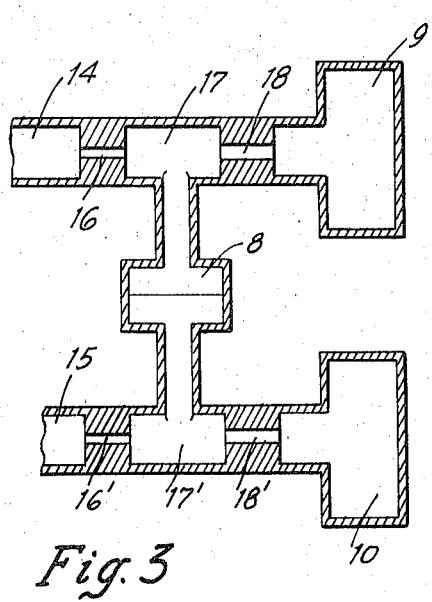
Figure 4A:
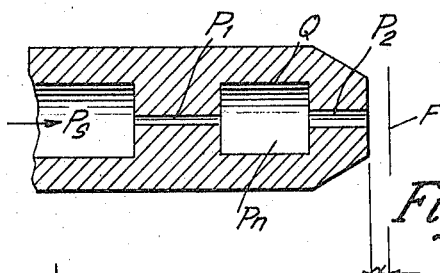
Figure 4B:
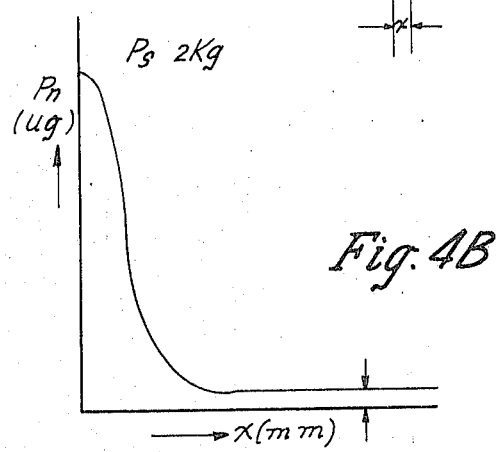

Similarly, in the piping conduits supplying the increasing air flow in FIG. 1, should there be a change in the volume flow due to an air leak in the two air-tight receptacles 9 and 10 as in FIG. 2, the occurrence of a pressure differential between the conduit of the two receptacles makes possible detection by the detector 8. FIG. 3 is an enlargement of the volume flow adjustment structure section represented in FIG. 1 by the dotted line. Number 12 represents the air-tight receptacle containing the test object; 13 is the reference air-tight receptacle having the same capacity as 12; 14 and 15 represent the inflow sides for air decompressed by the application of an appropriate pressure from the source of the increasing pressure air supply. The latter is supplied in a decreased volume by passing through two small diameter conduits 16 and 16', after which it enters neighboring conduit chambers 17 and 17', from which it passes through even smaller diameter conduits 18 and 18' into the two air-tight receptacles 12 and 13. The pressure differential detector 8 is attached between the two conduit chambers 17 and 17'. The dimensions of the conduits shall be selected so that the conduit resistances of the piping supplying the pressurized air to the two receptacles are equal. FIG. 4 is a diagram explaining the volume flow adjustment section of FIG. 3 in accordance with air micrometer theory. When the air Ps, decompressed by the application of appropriate pressure from the side of the pressurixed air source, passes through the small diameter conduit P1, enters the next large diameter chamber Q, passes through the yet smaller diameter conduit P2, and flows out into space, the volume flow may be arrested by by-passing the two small diameter conduits P1 and P2. The relation between the aperture distance X from the outflow exit to the flapper F just outside it and the counter-pressure (the pressure inside chamber Q) Pn at the flapper F is as illustrated in the example in FIG. 4B. With a Ps pressure of 2 kg and the flapper F at a distance from the outflow exit of more than 0.1 mm, the counter-pressure Pn is constant; even in the case of complications developing in the interior of the receptacle and a turbulence flow occurring therein, the counter-pressure Pn is constant at points 17 and 17' where the pressure differential detector 4 is attached; there is no occurrence of a pressure differential, and no turbulence flow can develop in the pressurized air flowing into the two receptacles.

The present invention thus makes it possible to provide a steady pressurized air flow such that the volume flow of the pressurized air is arrested in the two volume flow adjustment sections along the circuit route, so that there is no sudden pressure increase in the two receptacles, and such that problems like turbulence flow or compression, occurring gradually over a fixed period of time, do not arise. As a result, should there be an air leak in the test object in the air-tight receptacle containing the same, the pressure differential detector attached between the conduits of the two receptacles will be able to detect it.

As described above then, the present invention requires no equipping with a storage tank of fixed volume to facilitate the flow supply of pressurized air to the two air-tight receptacles, as is the case with traditional solid-type air leakage testers. Furthermore, the construction of the tester distribution piping is simple. Inasmuch as a storage tank is not used, the capacities of the two air-tight receptacles are not affected by the volume of this storage tank, and as a result, the air leakage detector of the present invention can also be adapted to the air-tight receptacles, whose capacities are proportionate to the test object. It is this which constitutes the main advantage of the present invention.

I claim:

1. An air leakage and volume error detector comprising means supplying air to two conduits at equal pressure, an air tight receptacle connected to each conduit, a restriction in each conduit between the receptacle and supply means and differential pressure transducer communicating with both receptacles, the receptacles being of the same volume and adapted to receive a test piece or reference piece.

* * * * *